United States Patent [19]

Silverman

[11] 3,832,547

[45] Aug. 27, 1974

[54] APPARATUS FOR TRANSFERRING A UNIQUE MICROPATTERN OF MICROPERFORATIONS IN A FIRST METAL LAYER TO AN UNDERLYING SECOND METAL LAYER

[76] Inventor: Daniel Silverman, 5969 S. Birmingham, Tulsa, Okla. 74105

[22] Filed: June 13, 1972

[21] Appl. No.: 262,290

Related U.S. Application Data

[63] Continuation of Ser. No. 60,399, Aug. 3, 1970, abandoned.

[52] U.S. Cl. ................ 250/319, 250/316, 346/76 L
[51] Int. Cl. ................ G01d 15/10
[58] Field of Search ................ 250/65 T; 346/76 L

[56] References Cited

UNITED STATES PATENTS

| | | | |
|---|---|---|---|
| 2,616,961 | 11/1952 | Groak | 250/65 X |
| 3,256,524 | 6/1966 | Stauffer | 346/76 |
| 3,322,033 | 5/1967 | Silverman | 346/76 X |
| 3,427,634 | 2/1969 | Crabtree et al. | 346/76 X |
| 3,474,457 | 10/1969 | Becker | 346/76 |
| 3,570,380 | 3/1971 | Kamenstein | 346/76 X |

OTHER PUBLICATIONS

"Laser Hole Making in Printed Circuit Boards" by S. H. Kremen from "IBM Technical Disclosure Bulletin," Vol. 8, No. 3, Aug., 1965, page 434.

*Primary Examiner*—William F. Linquist

[57] ABSTRACT

In the field of the storage and retrieval of information, information records in the form of patterns of microspots of small size and high packing density are formed on a record web by the use of a focussed first laser beam, of a first level of intensity, to evaporate or burn away material to form microperforations in a thin layer of opaque first material on a web of transparent plastic. This invention covers the process of preparing a facsimile record of the pattern of microspots on a master record by exposing a second record web through the microperforations to a focussed second laser beam of less intensity than the first level of intensity.

21 Claims, 11 Drawing Figures

INVENTOR.
Daniel Silverman

INVENTOR.

Daniel Silverman

APPARATUS FOR TRANSFERRING A UNIQUE MICROPATTERN OF MICROPERFORATIONS IN A FIRST METAL LAYER TO AN UNDERLYING SECOND METAL LAYER

This application is a streamlined continuation of my copending application Ser. No. 60,399, filed Aug. 3, 1970, entitled: Method and Apparatus for Preparing Master and Facsimile Digital Spot Records, now abandoned.

1. Field of the Invention

This invention is concerned with the storage and retrieval of information in the form of patterns of spots of small size and high packing density on a record web, in the form of strips, discs, and webs. More paticularly, it is concerned with the preparation of the information record and of duplicate facsimiles of the information record, particularly where the spots are recorded on the record medium by means of a high intensity beam of coherent radiation, such as a laser beam.

2. Prior Art

In the art of information storage and retrieval, there has been wide use of photographic film as the information medium, with exposure resulting from a flying spot on the face of a cathode ray tube (CRT). More recently tje CRT has been displaced by a focussed beam of coherent radiation from a laser, since such a focussed beam can be made of much smaller size, and thus can produce patterns of higher packing density.

The use of a focussed laser beam of high intensity permits preparation of optical records of a non-photographic nature on record media which are of such a nature that the high intensity laser beam can burn or evaporate material from a thin opaque layer, such that a transparent opening is formed through the opaque layer, or conversely an opaque spot is formed on a transparent record, or a non-reflecting spot is formed in a reflecting layer.

Since such a record may carry as many as $10^9$ individual spots it takes a long time to prepare the record, and in case a copy is desired, it takes an equally long time to duplicate the record by a simultaneous reading and writing operation.

This invention is concerned with a system for preparing a suitable master record and of duplicating the master record rapidly and inexpensively to form a facsimile record of said information, which can potentially be used in place of the master record. The object of this invention is thus to provide a method and apparatus for preparing a master record of information spot patterns by laser means and preparing facsimile records of the master record.

BRIEF DESCRIPTION OF THE DRAWINGS

Other objects and details of this invention will be better understood from the following description of the invention taken in connection with the appended illustrations, in which.

FIGS. *5a*, *5b* illustrate one step on the preparation of a facsimile record.

Figure 6:
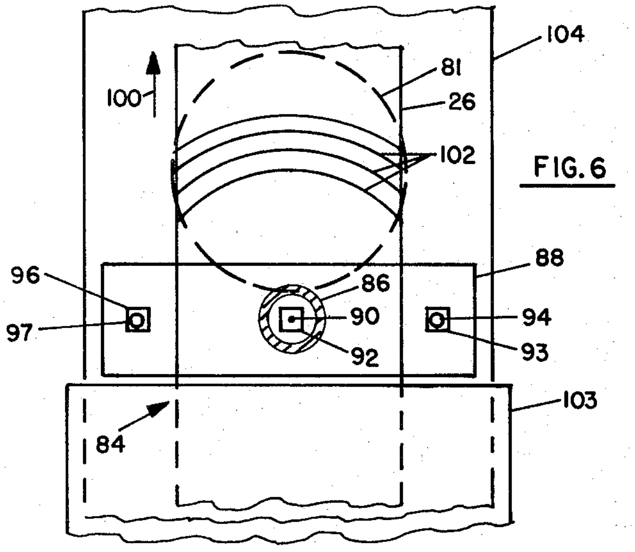
Figure 8:
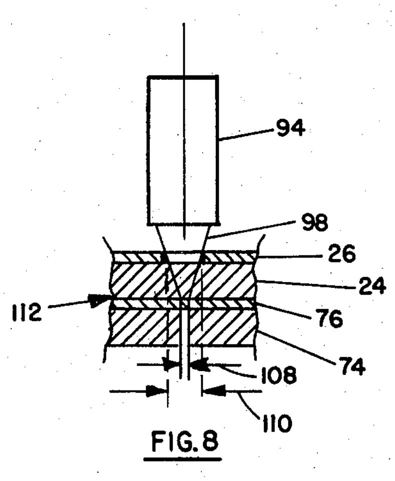
Figure 7:
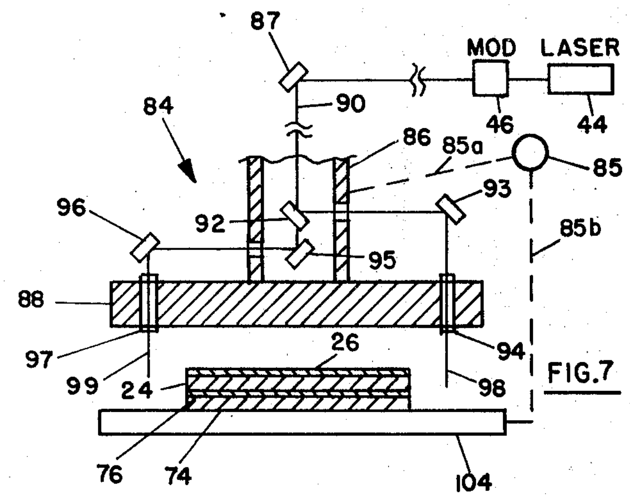

FIGS. 6, 7 and 8 illustrate a preferred embodiment of an apparatus for preparing laser recorded facsimile records from a laser-recorded master record.

Figure 10:
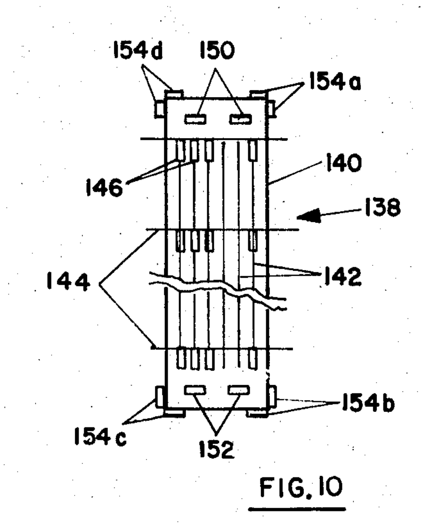
Figure 9:
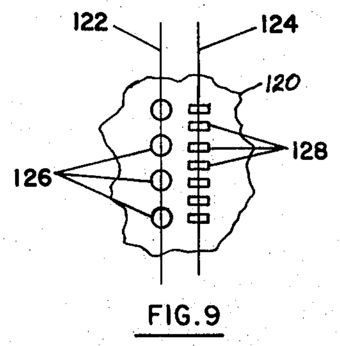

FIG. 9 represents a portion of a record with circular and non-circular spots, and FIG. 10 represents one possible layout of a master record.

DETAILED DESCRIPTION OF THE INVENTION

Figure 1:
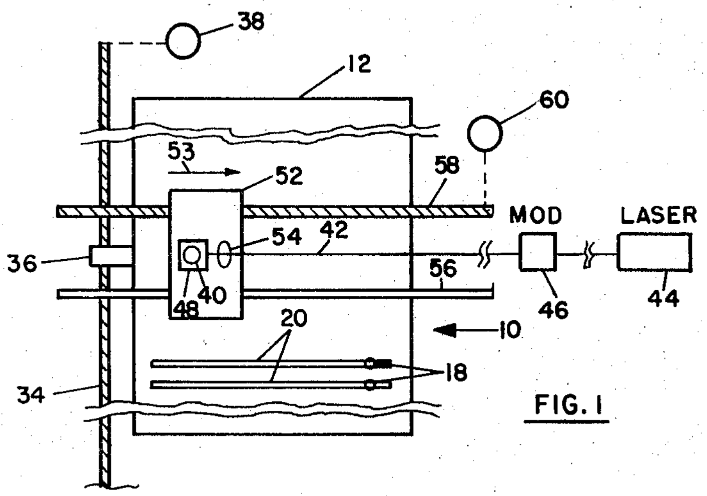
FIGS. 1, 2 and 3 represent different views of one embodiment of the invention, illustrating the preparation of a master record by the use of a high-intensity focussed laser beam.
Figure 2:
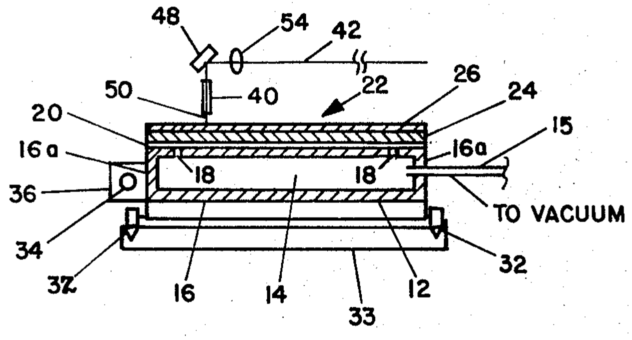
Figure 3:
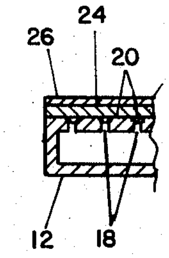

Referring now to the drawings, and in particular to FIGS. 1, 2 and 3, which represent one embodiment of this invention. The numeral 10 represents a table or platen 12 having an internal cavity 14 enclosed by bottom 16 and sides 16*a*. Tube 15 leads to a vacuum source. There are small perforations 18 leading to shallow transverse channels 20 on the top of the platen. These permit the vacuum in space 14 to hold to the top of plate 12 a record 22. This record generally comprises a backing sheet 24 which may be of transparent plastic such as Mylar, (manufactured by the E. I. du-Pont de Nemours Co. of Wilmington, Del.) with a very thin layer of opaque material 26 on top. This can be a thin layer of evaporated metal, or an organic material, such as photographic emulsion, etc., such that it can be burned away, melted or evaporated by an intense, focussed beam of electromagnetic energy, such as a laser beam. Alternatively, the record 22 can be a thin metal foil or similar material. However, the preferred form is a transparent carrier sheet with a thin layer of opaque material.

When this record 22, or master, is placed on the platen 12 and radiation from laser 44, light modulator 46, beam 42, mirror 48 and optics 54 and 40, applied to the opaque layer 26, the material will be heated over a very small area or spot, and the opaque layer will be burned away, melted or evaporated under the heating of the beam, leaving a small perforation or microperforation in the opaque layer, and a transparent spot through the record 22. By moving the carriage 52 along the lead screw 58 and on rail 56, by means of motor 60, in the direction 53, and by moving the platen 12 along rails 32 by means of lead screw 34 and motor 38, the focussed laser beam can be applied to the record 22 at any point on its surface. Thus a microspot pattern of any type can be recorded.

Figure 4:
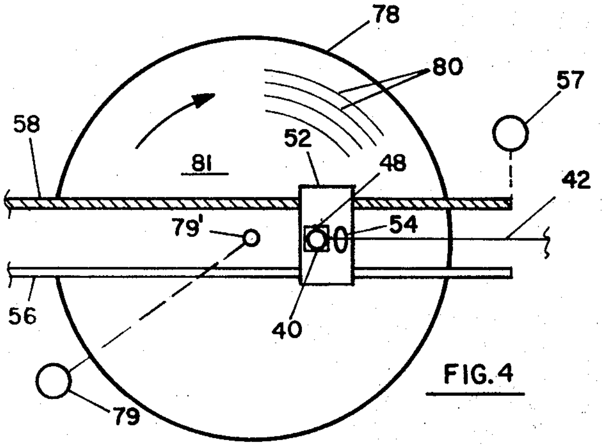
FIG. 4 illustrates a second embodiment of an apparatus for preparing a circular master record.

In FIG. 4 I show another embodiment for recording a predetermined pattern of perforations in an opaque layer on a master record web. In this case the record 81 is circular, being placed on a circular table 78, and held there by vacuum, for example, similar to FIGS. 1 and 2. The table rotates about an axis 79' by means of motor 79. Track 56, screws 58, and carriage 52 (similar to the corresponding parts to FIGS. 1 and 2) are positioned so as to move along a radius of the table. Thus, as the carriage is successively positioned to larger values of radius, a plurality of circular tracks 80 will be traced out by the beam 42, to record data on the record web as in FIGS. 1 and 2.

I have described a plane rectangular platen and an X-Y system of traverse as in FIGS. 1 and 2, as well as a rotating disc as in FIG. 4. It will be clear that any form of relative traverse of the laser beam and the record can be used, including the conventional drum, (not shown) with a traverse mechanism such as shown in FIGS. 1 and 4.

While I have not described the optics in detail it will be clear that the focussed first beam can have a conventional circular spot focus. However, by the use of cylindrical lenses or mirrors, well known in the art, the focussed spot can be made of elongated shape, which may be more useful in the preparation of high packing data storage records. This will be discussed further in connection with FIG. 9.

By the apparatus of FIGS. 1, 2 and 4, a master record can be made that has a pattern of transparent microperforations through a very thin opaque layer. The problem is, having prepared this master record, how can it be duplicated without carrying out the same point-by-point recording process by which the master record was prepared. Since there may be as many as $10^9$ spots on the record, it is expensive and time consuming to prepare a duplicate in this way.

In this invention I prepare a duplicate by exposing a facsimile record sheet to a foscussed laser beam through the transparent spots of the master record. The facsimile record is to be of the same type as the master, that is, a record in which the transparent spots are made by a sharply focussed laser beam. Since the laser beam must project through the master record to evaporate the opaque material from the facsimile web, and since the laser which records the facsimile must not disturb or modify the master record in any way, special attention must be paid to the nature of the opaque materials on both the master and the facsimile records, and the intensity of the laser beam during the operations of recording the master and recording the facsimile records.

Figure 5A:
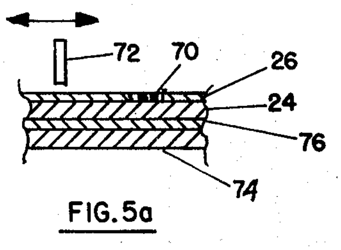
Figure 5B:
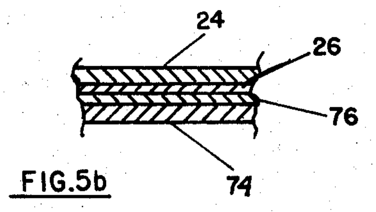

Consider the master record 22 of FIG. 2 with its plurality of perforations arranged on an X-Y matrix of points. As shown in FIGS. 5*a* and 5*b*, this record with its support web 24 and perforated opaque layer 26 is placed on top of a similar type of record web, the facsimile record web. The opaque layer 76 of the facsimile record web is unperforated. The problem is to burn into, or melt, or evaporate from the layer 76 (on base material 74) small spots in the identically-spaced pattern, as on 26. This is done by the apparatus shown in FIGS. 6 and 7.

In FIGS. 6 and 7 I show a table 104 on top of which is placed the pair of records (26, 24) on top of (76, 74). Incidentally the top (master) record can be with opaque layer uppermost, as shown in FIG. 5*a* or in inverted fashion as shown in FIG. 5*a b*. These will be discussed further. These records are held to the table 104 by vacuum means, such as in FIGS. 1 and 2, or by other means (not shown), but well known in the art. Also, table 104 has wheels that are guided in tracks (not shown) similar to FIGS. 1 and 2, to permit traversing the records in the direction of arrow 100.

Fixed over the table and supported by means not shown, but well known in the art, is a tube 86, which supports a horizontal arm 88. The tube and arm are arranged for rotation about the axis of the tube 86 by motor 85 through means 85*a*. There is a laser 44 and light modulator 46 which form a beam which is directed by mirror 87 as beam 90 along the axis of the tube 86. Partially-reflective mirror 92 reflects part of this beam 90 horizontally to mirror 93 and optics 94 in one end of arm 88. The light that passes mirror 92 goes to mirrors 95 and 96 and then to optics 97.

The two optics, 94 and 97, are at the same radius so as the arm 88 rotates the beams 98 and 99 trace out a circle. They are also positioned with respect to the records on the table 104 so that the beams 98, 99 are brought to a sharp focus at the level of the opaque layer 76 on the lower (facsimile) record. Now since the overlying master record has a predetermined pattern of perforations in its opaque layer 26, as the arm 88 rotates and the table translates, the optics 94, 97 will sweep out adjacent circular traces 102. These can be slightly overlapped, so that in the course of the complete traverse of the table, the complete area of the record layer 26 will be irradiated by the focussed beams 98, 99 from the laser 44. As the beams pass over perforations in the layer 26, they will pass through the perforations, through the transparent layer 24 and will strike the opaque layer 76 of the facsimile record and will burn to evaporate perforations in this layer in the precise position of the perforations in the layer 26. The table 104 is driven in synchronism with the rotating arm by means 85*b* from the same motor 85 that drives the arm. While I have shown duplicate beams 98, 99 scanning the surface of the records, it will be clear that a single beam can be used with appropriate speed of the table. Also any other suitable scanning system can be used.

It will be clear that the radii of the optics 94 and 97 must be greater than half the width of the record 12 so that the entire surface of the record 26 will be covered by the scanning beam or beams 98, 99. It may be desirable to have a fixed opaque mask 103 placed intermediate the top of the record, 26 and the optics 98, 99 to shield the record from the beams on their "back swing".

Also, in FIG. 6 I show in dashed line a circular record 81 on top of the table 104 in position to have a facsimile record made. Here again the radii of the beams 98, 99 must be greater than the radius of the record 81.

For a drum system, a rectangular record such as 26 can be wrapped around and fastened to the drum by means well known in the art.

One or more of the parameters of the recording system (26, 24) and (76, 74) must be different for the cases of the original recording of (26, 24) and the recording of the facsimile (76, 74), otherwise, in recording the facsimile the master will itself be modified, and therefore destroyed as a record. Among the parameters that affect the recording are:

1. the melting or boiling point temperature of the material of the opaque layer,
2. the thickness of the opaque layer,
3. the dwell time or rate of relative movement of the focussed beam across the record, and
4. the sharpness of focus of the laser beam.

This is an important part of my invention, and I will describe several combinations of parameters that will permit recording the facsimile record through the master record without altering the pattern of the master record.

Case *a*. I propose to use an opaque material on the master that has a higher melting or boiling point than the opaque material or the facsimile. Then, a higher intensity of radiation (at the same time dwell time) will be required to record the master, and therefore the less intense radiation, which will not effect the master layer 26, will still pass through the microperforations in 26 and burn corresponding microperforations in the layer 76.

Case *b*. In this case, the two materials of layers 26 and 76 can be the same, except that the thickness of layer 26 is greater than that of 76. Then for the same dwell time, corresponding to the copying operation, the microperforations will be burned into 76 before they can be burned into 26.

Case *c*. Another way to provide a differential burning effect is to design the focal system of optics 94, 97 and the geometry of the record webs as shown in FIG. 8. Here the optics 94 forms the beam 98 which is a sharply converting beam. Beam 98 is brought to a focus at the layer 76, and has a spot of minimum diameter 108. This same beam at the level of layer 26 has a much larger cross-sectional area, of diameter 110. Thus, the intensity of radiation per unit area is much higher at leyer 76 than it is at 26, and while the intensity of the small spot on 76 will burn a hole, the unfocussed spot at 26 will not burn a hole. This effect is a function of the thickness of the base layer 24, which can arbitrarily be increased to enhance this effect. Conversely, a separate web of transparent material (like 24 and 74) can be inserted at the arrow 112 between layers 24 and 76 to enhance this effect.

As to materials, I prefer that the opaque layers be evaporated films of metal that have inherently a highly reflective surface such that when a perforation is burned into the material, the area of the spot changes from a highly reflective surface to essentially a non-reflecting surface, and so facilitates detection of the perforation. Some possible surfaces comprise evaporated films of metals such as rhodium, aluminum, etc. Many different metals can be used. Other types of opaque materials can be organic materials such as an exposed photographic emulsion, etc.

The thickness of the opaque materials can vary from 0.0005 inch or less to possibly 0.010 inch. The smaller thickness would be suitable for the metals, while the greater thickness would apply to the organic materials. In general, the film should be of uniform properties so that once the conditions of beam intensity and rate of scan, or sweep, are chosen, all perforations will be identical.

It will be clear then, that with the proper adjustment of the parameters of the recording process, that an apparatus such as shown in FIGS. 6 and 7, with the proper types or thermal characteristics, and the proper thicknesses of material on the master and facsimile webs, and the proper intensity of radiation in the focussed beams 98, 99, can be used to duplicate and make identical facsimile patterns of perforations in the opaque layer on the facsimile as are on the master record. Once the records are placed on the table and the motor 85 started, the entire area of the master record will be scanned by the focussed beams and perforations will be burned in the facsimile record whenever the focussed beams project through the perforations in the master record.

I will sepak of the "thermal characteristics" of the opaque layer, meaning the melting and/or boiling point of the material. I will speak of the "adjustment of the parameters of the recording process" as the thermal characteristics, intensity of the radiation and speed of scan and the thickness of the layer.

If the master record is placed on the facsimile record in the inverted position, as shown in FIG. **5*b*, there will be a better precision of duplication of the pattern of the master record. However, in this condition, it is obvious that the system of differential burning of perforations as illustrated in FIG. 8** cannot be used, and either of the other two alternatives, (cases *a* or *b*, of providing an opaque material of higher boiling point on the master record, or providing a more massive opaque layer on the master record must be used.

In the use of records of the type illustrated, that is with a thin opaque layer of a material that can be burned or evaporated by a focussed laser beam, it is often necessary to prepare the records with a preliminary pattern of spots which line up the separate traces (provide column indicia), and perhaps place time marks (or row indicia) along the traces. These can be very easily placed on the master record, by preparing a "super master" record by the means shown in FIGS. 1 and 2, and then copying this pattern onto master records placed in the position of the facsimile records in FIGS. 6 and 7. This is duscussed further in connection with FIG. 10. Later, after these master records have been used to record data (within the framework of rows and columns placed on them by copying the supermaster record), the recorded master records can be copied by the apparatus shown to provide facsimile records which can be used for archival storage, or as spares in case the master records become injured or destroyed.

In FIG. 9 I show a portion of a record 120 with two columns 122, 124 of spots. In column 122 the spots 126 are circular, normally provided by a focussing optical system. In column 124 I show spots 128 which have been flattened to an oval shape by passage through a cylindrical lens or reflected by a cylindrical mirror as is well known in the art. It will be clear that the packing density, or spots per square inch of record will be greater for column 124 than for column 122.

While I have illustrated only those types of facsimile records in which an opaque layer has microperforations burned into it by a high intensity focussed laser beam in the positions corresponding to similar microperforations in a master record, the same apparatus and methods can be applied to preparing facsimile records of other types in which the character of the record medium in the areas of the spots can be altered by the laser beam, including, but not limited to, photographic records including vesicular materials such as Kalvar, photochromic materials, photo-resist coatings on metals to be chemically etched, and so on.

Also, while I have illustrated a digital type of record, the same processes can be used for analog records, where the record itself instead of being a pattern of spots might be composed of line drawings as halftone pictures. For example, consider a record made up of a thin metal layer on an insulating plastic sheet. Consider a picture in which certain areas are to be printed. By the apparatus of FIG. 1, the pattern of areas to be printed are burned away leaving a pattern of conducting areas and a corresponding pattern of insulating areas. If now the entire surface is exposed to a corona discharge and the metal parts grounded the result will be a pattern of charged areas, with all the metal areas uncharged. This pattern of charges can be developed by means of a toner powder, and the powder transferred to another sheet and fixed. If the original record was wrapped around a drum and apparatus provided to perform the above steps, we would have a high speed noncontacting electrostatic printing system.

Among the various patterns of microperforation that might be used in the records produced in this invention I show in FIG. 10 a preferred embodiment. This involves on the sheet 140 a plurality of columns 142 spaced parallel to each other with equal spaces between. Each of these columns has a small group of microperforations or micropatterns 146 recorded along each of the columns 142 at spaced positions marked by rows 144. Each of these micropatterns can have digital codes representing addresses in the form of column number and row number, or similar information. This pattern could be placed on the record by the precisely positioned recording means of FIGS. 1 and 2 (and a similar pattern could be used for circular records as in FIG. 4).

Also recorded at the same time, that is, without changing the position of the record 140 on the recording platen, are areas 150, 152 which would be used later to guide means to punch out for the use of hold-down fingers in the attachment of these records to recording drums. Also areas 154 might be marked out as guides to a punch that would cut off excess material on the sides and ends.

Having the indices marking the columns and rows, digital data can be recorded in the inter-index areas of the columns. Later after the recorded record is placed on a suitable drum and scanned by a laser beam, the particular data can be located rapidly by traversing the columns until the proper one is found, and rotating the drum until the proper row is found, etc.

Of course indices 146 can be placed on each column of data, or every 5th or 10th column (for example) can be marked in this way, and other means, associated with the optical system, used to mark and find the intervening columns.

A supermaster record of this type would be useful by the method of this invention in preparing unrecorded record media for rapid data entry.

While I have illustrated several embodiments of this invention, and have fully described the principles involved, there may be many other embodiments devised by those skilled in the art based upon the principles described. All of these embodiments are to be considered part of this invention, the scope of which is limited only by the scope of the appended claims.

I claim:

1. A system for directly transferring information in the form of a unique micropattern of microperforations in a thin first metal layer to an underlying thin second metal layer, comprising:

a. a master record web comprising a first thin metal layer carrying information in the form of a first unique micropattern of microperforations, said first metal layer composed of a first metal, of a first thickness of a first thermal characteristic;

b. a facsimile record web comprising a base portion and a second thin metal surface layer, said second metal layer composed of a scond metal, of a second thickness of a second thermal characteristic;

c. means to press said master web superimposed in intimate contiguous coplanar relation on top of said facsimile record so that each web remains in fixed relation with respect to the other web;

d. optical means to focus a continuous beam of laser radiation of a selected constant level of intensity on the surface of said master web, and means to relatively move said optical means over substantially the entire area of said master web in a plurality of parallel paths, at a selected velocity; and wherein e. said first metal is different from said second metal in that said first metal has a higher melting point than the melting point of said second metal;

whereby said focussed beam will penetrate said microperforations in said first metal layer and irradiate said second metal layer below, and will burn microperforations in said second metal layer in a second micropattern which is identical to said first micropattern.

2. The system as in claim 1 in which said first metal layer is thicker than said second metal layer.

3. The system as in claim 1 in which said first pattern of microperforations comprises a two-dimensional array of microperforations arranged in a plurality of spaced columns.

4. The system as in claim 3 in which said parallel paths are parallel to said columns.

5. The system as in claim 4 in which said parallel paths overlie each of said columns.

6. The system as in claim 1 in which said parallel paths are arcuate.

7. The system as in claim 1 in which said master web comprises said first metal layer in intimate contiguous contact with a laser-transparent base layer.

8. The system as in claim 7 in which said master web is placed on said facsimile web with said first material uppermost.

9. The system as in claim 7 in which said master web is placed on said facsimile web with said first material in contact with said second material.

10. The system as in claim 1 in which said focussed beam is directed perpendicular to the surface of said master web.

11. The system as in claim 1 in which said parallel paths are contiguous.

12. The system as in claim 1 in which said master web is circular, and said first pattern comprises a plurality of microperforations arranged in a plurality of concentric spaced circles.

13. The system as in claim 1 in which the thickness of said second thin metal layer is less than 0.005 inch.

14. The system as in claim 1 in which the thickness of said second thin metal layer is less than 0.001 inch.

15. The system as in claim 1 in which said microperforations have substantially a circular shape.

16. The system as in claim 1 in which said microperforations have a non-circular shape.

17. The system as in claim 1 in which said first material has a thickness of less than 0.010 inch.

18. The system as in claim 1 in which said first material is rhodium and said second material is aluminum.

19. The information system as in claim 1 in which said first material is a thin evaporated film of metal.

20. The system as in claim 1 in which said second material is a thin evaporated film of metal.

21. The system as in claim 1 in which the beam passing through the microperforations in said first metal is focussed on said second metal.

* * * * *